(12) United States Patent
Wu et al.

(10) Patent No.: US 7,560,696 B2
(45) Date of Patent: Jul. 14, 2009

(54) ADJUSTABLE SENSOR

(75) Inventors: Yun Wu, Bayside, NY (US); John Bandringa, Everett, WA (US); Paul Soccoli, New Hyde Park, NY (US); Nehal Shah, Westbury, NY (US); Alfred J. Lombardi, Syosset, NY (US); Edward Uftring, Syosset, NY (US); Adam Kevelos, Plainview, NY (US); Thomas Leonard, Tualatin, OR (US); David Weigand, Portland, OR (US); John Engel, Portland, OR (US)

(73) Assignee: Leviton Manufacturing Company, Inc., Little Neck, NY (US)

( * ) Notice: Subject to any disclaimer, the term of this patent is extended or adjusted under 35 U.S.C. 154(b) by 0 days.

(21) Appl. No.: 11/742,542

(22) Filed: Apr. 30, 2007

(65) Prior Publication Data

US 2007/0262259 A1    Nov. 15, 2007

Related U.S. Application Data

(63) Continuation-in-part of application No. 11/207,729, filed on Aug. 22, 2005, now Pat. No. 7,211,798.

(51) Int. Cl.
*G01J 5/02* (2006.01)
(52) U.S. Cl. .................. 250/342; 250/DIG. 1
(58) Field of Classification Search ........... 250/342, 250/353, DIG. 1
See application file for complete search history.

(56) References Cited

U.S. PATENT DOCUMENTS

| 5,780,854 | A | 7/1998 | Lin |
| 6,100,803 | A | 8/2000 | Chang |
| 6,781,129 | B2 | 8/2004 | Leen |
| 6,820,846 | B2 | 11/2004 | Knoski |
| 7,211,798 | B2 * | 5/2007 | Wu et al. ............ 250/342 |
| 2005/0116171 | A1 | 6/2005 | Lee et al. |
| 2006/0138329 | A1 | 6/2006 | Wu et al. |

OTHER PUBLICATIONS

Brochure-*The Walt Shopping, Inc.: DT-200 Dual Technology Sensor*—Pub. No. 6201; prior to 1999—1 page.
Leviton Lighting Control Division—Occupancy Sensor MultiTechnology Wall/Corner Sensor—Model No. ODW12-M—Copyright 2001—1 page.
International Search Report for PCT/US2008/058538; Jul. 3, 2008.

\* cited by examiner

*Primary Examiner*—Constantine Hannaher
(74) *Attorney, Agent, or Firm*—Collard & Roe, P.C.

(57) ABSTRACT

A sensor mounting mechanism that includes a base member adapted to be mounted to a structure and a base neck having a first end and a second end where the first end is adapted to be coupled to a sensor with a ball-socket coupling and the second end is coupled to the base member with a rotating coupling. The mounting mechanism provides fine and coarse adjustment means for adjusting the scanning area of the sensor such as an PIR occupancy sensor without the use of a tool. The sensor includes a detachable lens holder for easy replacement of the lens.

8 Claims, 14 Drawing Sheets

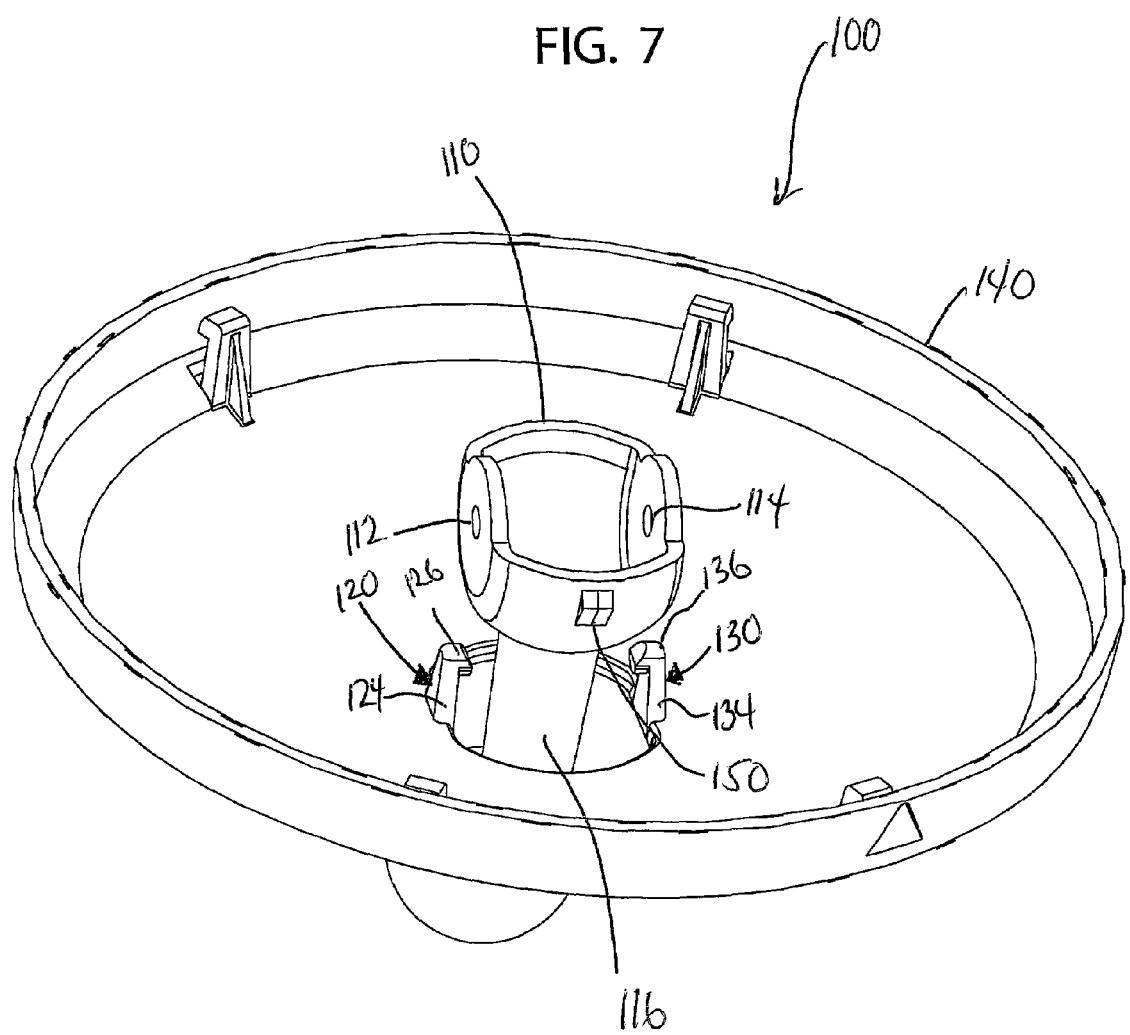

ADJUSTABLE SENSOR

CROSS REFERENCE TO RELATED APPLICATIONS

This application is a Continuation-In-Part application and hereby claims priority from U.S. application Ser. No. 11/207,729 filed on Aug. 22, 2005. That application claims the benefit of the filing date of a provisional application having Ser. No. 60/604,543 which was filed on Aug. 26, 2004, wherein the disclosures of both applications are hereby incorporated herein by reference in their entirety.

BACKGROUND OF THE INVENTION

1. Field of the Invention

The present invention relates to occupancy wall sensors.

2. Description of the Related Art

Normally, newly installed occupancy wall sensors, such as passive infrared (PIR) and/or ultrasonic occupancy wall sensors, when first installed, need to be positioned on a wall or ceiling and then oriented to scan an area of interest to provide the level of protection desired by the user. Frequently, the sensors, after being mounted to the wall or ceiling, must normally then be re-oriented a few times until they actually scan the area desired. Also, as the users needs change, existing wall sensors may need to be re-positioned and re-oriented to scan different areas at, possibly, different viewing angles.

Some current sensors may require a special tool which is provided by the manufacturer for use when installing and/or orienting the sensors the required adjustments. Sometimes the tool may not be readily available, particularly when the sensor is being re-positioned or re-oriented some time after first being installed on a wall. This type of adjustment can not only be difficult to perform, but can sometimes result in damage to the sensor as it is being re-mounted to the wall or being disassembled and then reassembled.

A key component of a sensor is the PIR lens. It is usually made of a thin, soft plastic material, the surface of which is prone to being scratched. The lens is usually relatively large to allow the sensor to cover a scanning area or scan a large field of view and, as the lens is mounted on the front surface of the sensor, it is prone to being damaged. For example, during the manufacture, shipping, handling and installation of the sensor the lens, which is a delicate and crucial component of the sensor, can be easily scratched or damaged. A scratched or damaged lens can prevent the sensor from operating properly. The lens on a sensor is not normally replaceable.

Another problem with current wall mounted sensors is the absence of a simple way of mounting the sensors to a wall or ceiling. Often, and particularly in industrial applications, the sensor can be located 30 feet or more above the floor. Thus, while on a ladder, the installer may have to hold the sensor over his/her head with one hand while trying to mount the sensor to the wall or ceiling with the other hand.

What is needed is a sensor which can be easily and quickly mounted to a wall or ceiling, oriented to scan a desired area, and has a lens that is quickly and easily replaceable.

SUMMARY OF THE INVENTION

The present invention helps overcome some of the above problems by providing an occupancy sensor which can be quickly and easily mounted and oriented to scan a specific coverage or scanning area without requiring a special installation tool. The sensor includes a relatively light weight, single piece mounting base which is separate from the body of the sensor and which can be mounted to a structure such as a wall or ceiling without requiring the installer to support the weight of the body of the sensor. Thereafter, the body of the sensor is mounted into the base which is mounted to the wall or ceiling and the sensor body is twist locked to the base to obtain coverage of different scanning areas. Additional adjustments can be made by loosening a threaded fastener such as a nut on the back of the sensor body. To help overcome the damage lens problem, the sensor includes a replaceable PIR lens with a snap on lens holder which can be attached to the sensor.

In one aspect of the invention, an occupancy sensor is disclosed that includes a base member adapted to be mounted to a structure such as a wall or ceiling, a PIR sensor and a base neck having a first end and a second end. The first end is coupled to the sensor with a ball-socket coupling and the second end is coupled to the base member with a rotating coupling. The ball-socket coupling and the rotatable coupling mechanism provide a combination of two freedoms of rotation for improved sensor adjustment. The lens is part of a replaceable lens holder which allows for easy replacement of a damaged lens. The techniques of the present invention are also applicable to other occupancy sensing technologies such as ultrasonic and microwave means.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWING

Other aspects, features and advantages of the present invention will become more fully apparent from the following detailed description, the appended claims, and the accompanying drawings in which similar elements are given similar reference numerals:

FIG. 7 is a back view of another embodiment;

DETAILED DESCRIPTION OF THE INVENTION

Figure 1A:
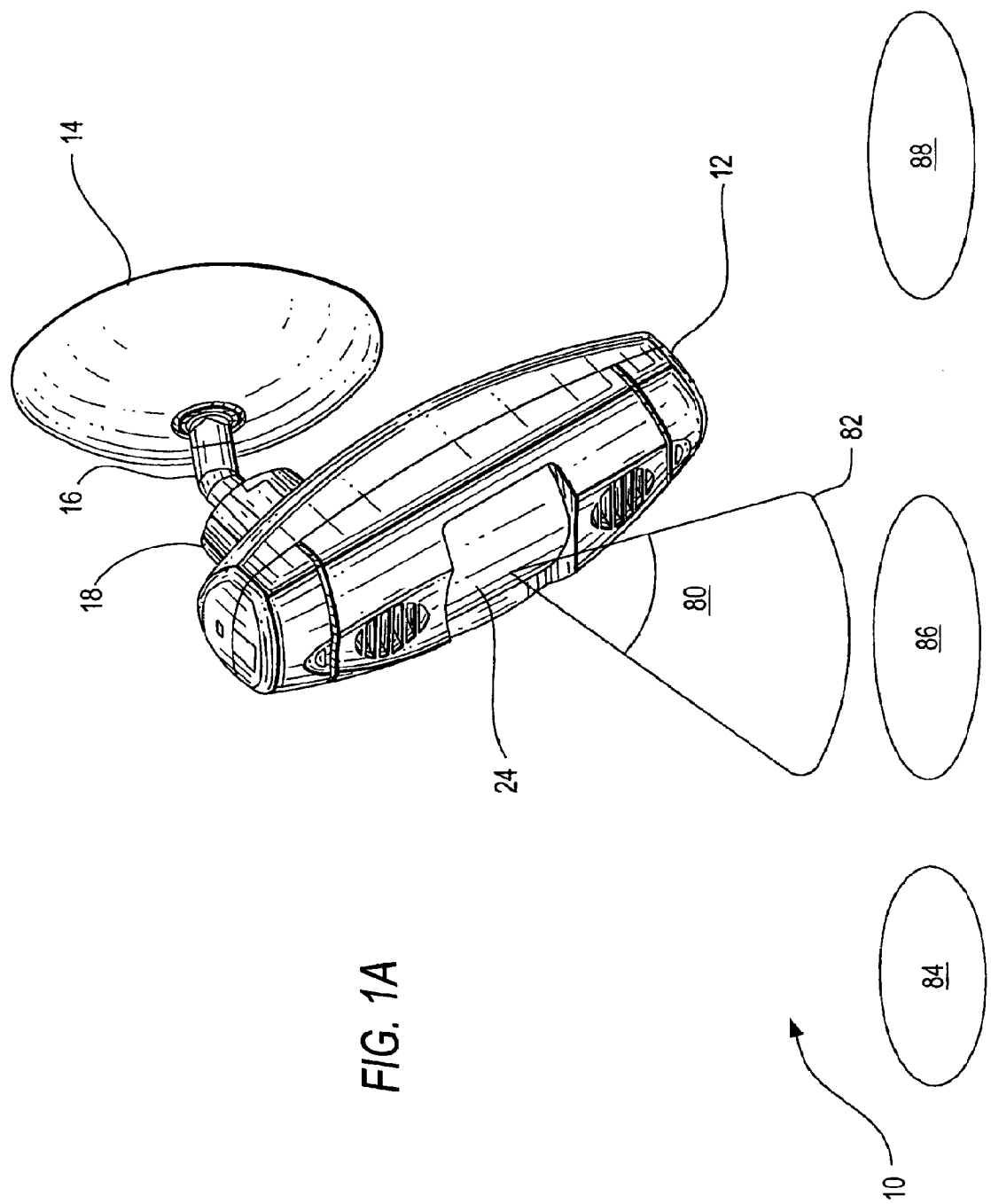
FIGS. 1A-1D are an isometric view, front view, side view and back view of an occupancy sensor in accordance with the principles of the invention.
Figure 1B:
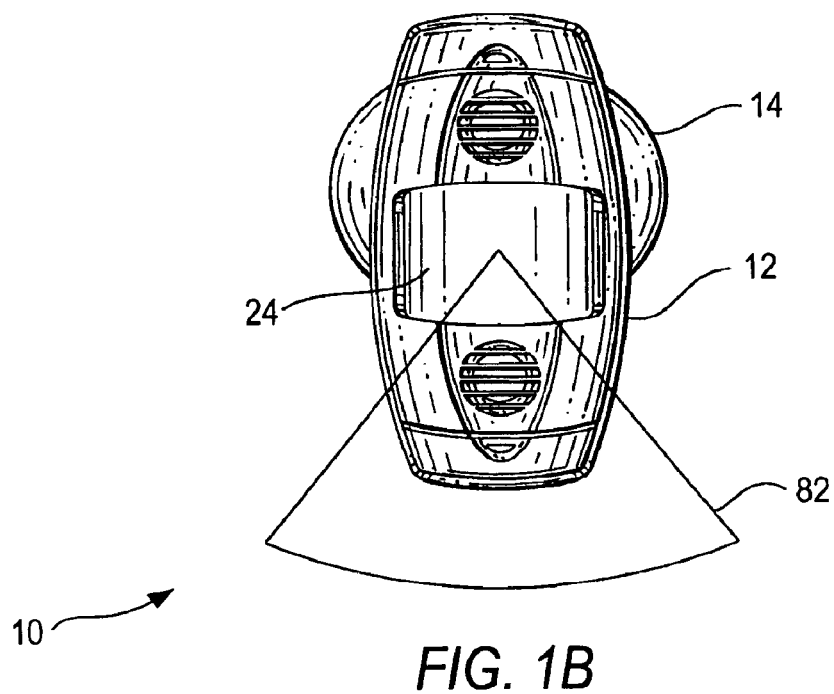
Figure 1C:
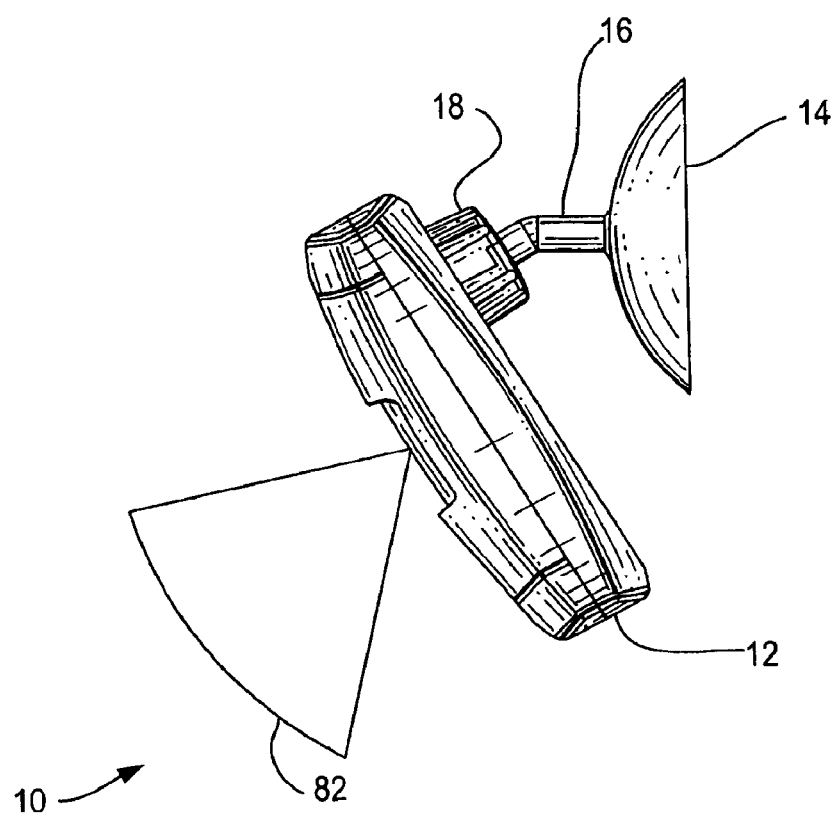
Figure 1D:
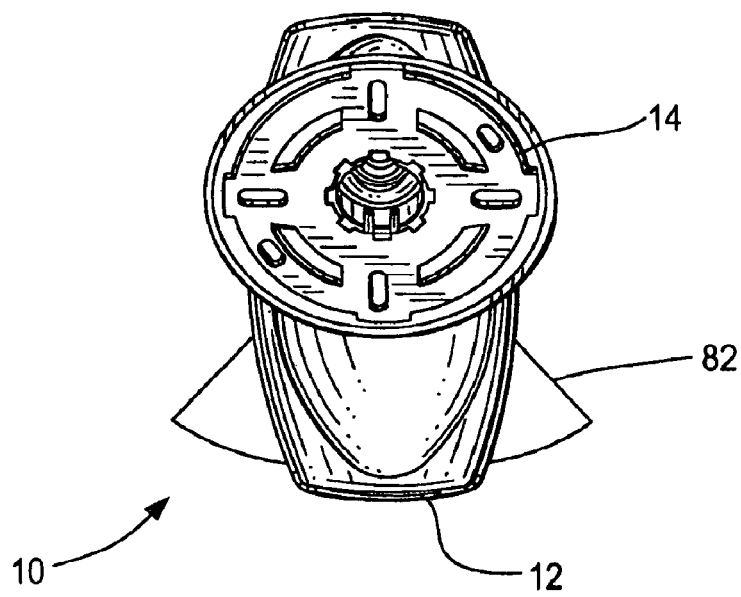

The present invention discloses an occupancy sensor having a passive infrared (PIR) lens holder coupled to a versatile mounting mechanism for adjusting the scanning or coverage area of the sensor without the use of a tool. The mounting mechanism includes a base neck member having a first end employing a ball-socket coupling to the PIR lens holder sensor body and a second end using a rotatable coupling to a mounting base. The ball-socket coupling and the rotatable coupling mechanism provide a combination of two freedoms of rotation for enhanced sensor adjustment. The lens is part of a replaceable lens holder which allows for easy replacement of a damaged lens. Although one embodiment of the present invention is directed to PIR sensing means, the techniques of the present invention are also applicable to other occupancy sensing technologies such as ultrasonic microwave means or a combination thereof.

Referring to FIGS. 1A-1D, there is shown different views of an occupancy sensor 10 in accordance with the principles of the invention. The sensor 10 includes a sensor body 12 with a replaceable lens holder 24 and a mounting mechanism comprising a base neck 16, nut 18 or other threaded fastener, and mounting base 14 for mounting the body 12 to a surface or structure such as a wall or ceiling. The lens holder 24 has a PIR lens with a fixed scanning range 82 defined by scanning angle 80 used for detecting the presence of occupants in different scanning (coverage) areas such as 84, 86 and 88. The mounting mechanism provides fine and course adjustment means for adjusting or orienting the position of the sensor body 12 to allow the scanning range 82 to cover different scanning areas 84, 86, 88. For example, the scanning range 82 of the sensor 10 is shown covering the scanning area 84. However, the sensor body 12 can be easily adjusted to cover scanning area 86 or 88 (as well as overlap areas), without having to adjust the scanning range 82 or angle 80. The course adjustment means is achieved by detaching the base neck 16 from the base 14, rotating the base neck 16 around the mounting base 14 to a desired position and then reinserting the base neck into the base. The fine adjustment means is obtained by loosening the nut 18, rotating the sensor body 12 around the base neck to a desired position and then retightening the nut. By providing a sensor body 12 separate from the mounting base 14, an installer can mount and orient the sensor 10 without having to support the weight of the sensor body 12 and without requiring a separate tool. In addition, the replaceable lens holder 24 can be easily detached for replacement of a damaged PIR lens.

Figure 2:
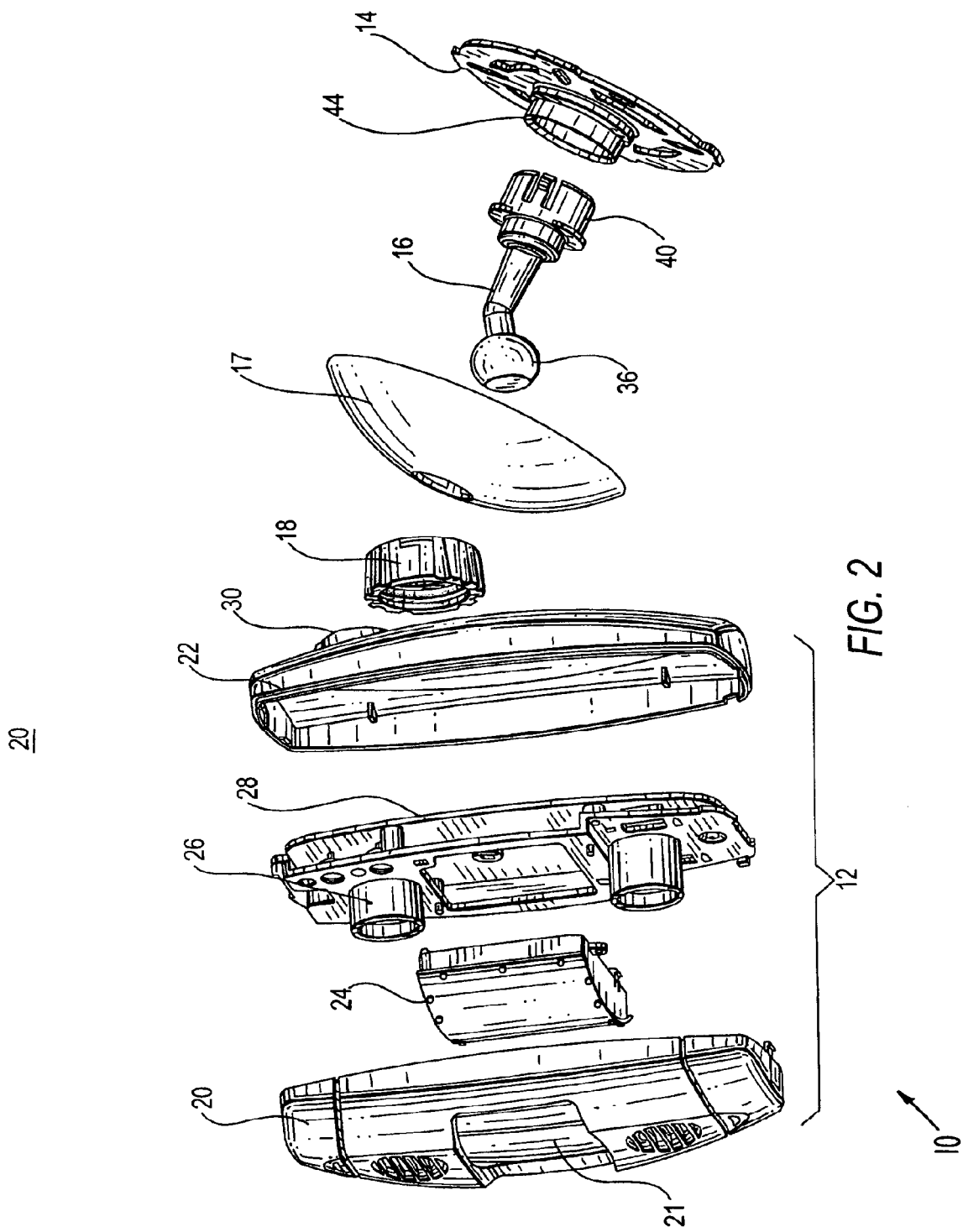
FIG. 2 is an exploded view of the sensor of FIG. 1.

FIG. 2 shows an exploded view of the sensor 10 of FIG. 1 in accordance with the principles of the invention. The rear side of the lens holder 24 is mounted to the front side of frame 26 and a printed circuit board (PCB) 28 having occupancy sensing circuitry is mounted to the rear side of the frame 26 forming a sensor unit assembly. The sensor unit assembly is mounted within the chamber of the back cover 22. A front cover 20 is mounted over the sensor unit assembly to form sealed sensor body 12. The front cover 20 has an opening 21 to expose the front side or lens portion of the lens holder 24. The front end of the base neck 16 has a ball shaped member 36 to couple to a cylindrical member 30 extending from the rear side of the back cover 22 to provide a ball-socket coupling. The front end of the base neck 16 is fastened to the cylindrical member 30 with the nut 18. The rear end of the base neck 16 has a cylindrical member 40 that fits in and is rotatably coupled to a cylindrical member 44 extending from the front side of the mounting base 14. A semi-spherical shaped base cover 17 is mounted over the mounting base 14 to provide an aesthetically pleasing appearance. The components of the sensor 10 can be made of various materials such as plastic, metal or a combination thereof.

Figure 3A:
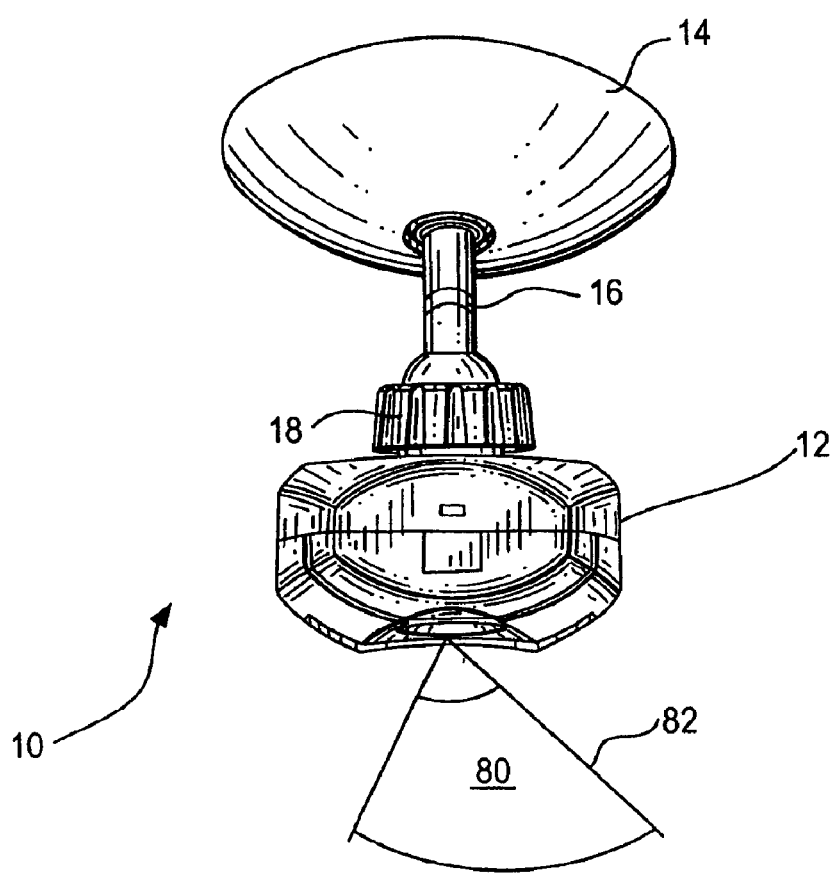
FIGS. 3A-3C show the sensor of FIG. 1 adjusted to different positions.
Figure 3B:
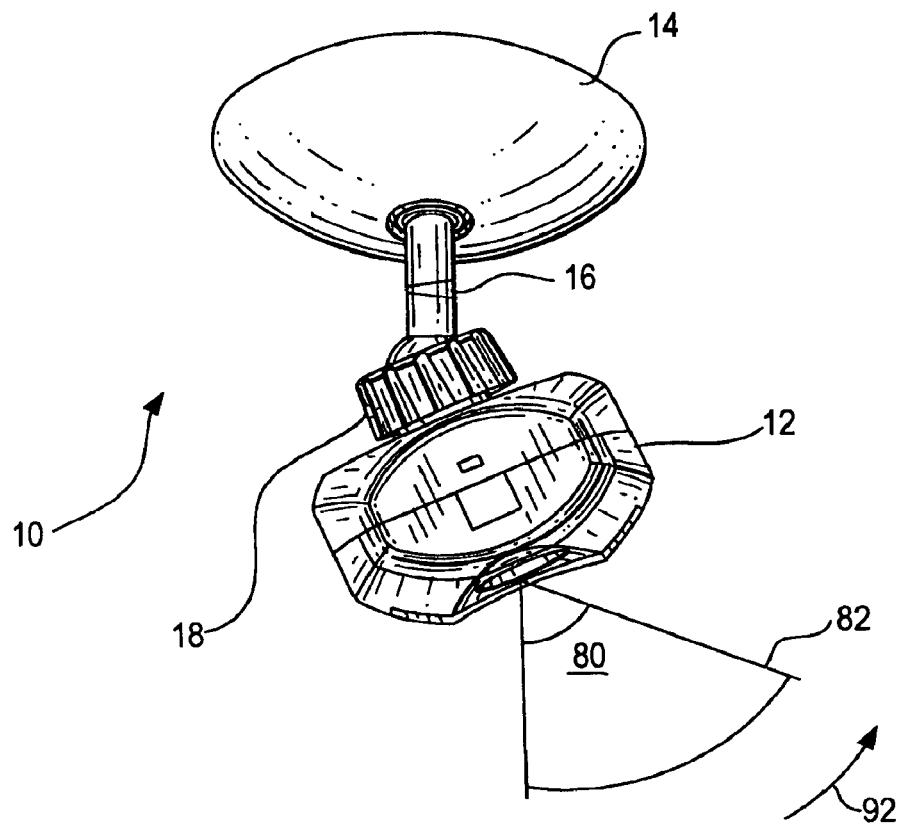
Figure 3C:
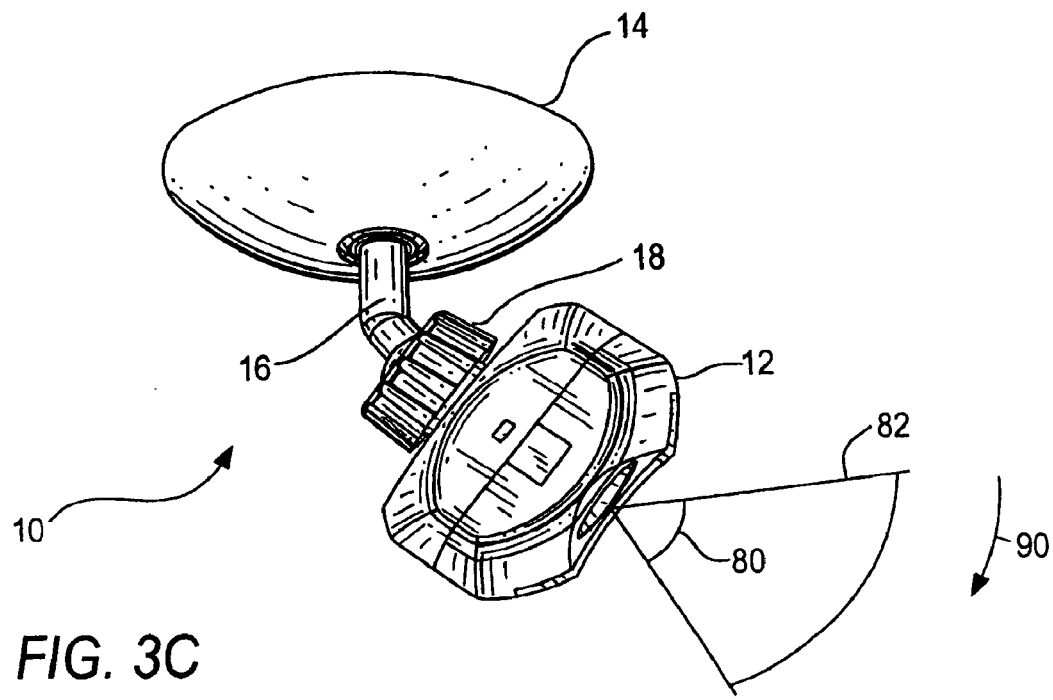

FIGS. 3A-3C show the mounting mechanism of the sensor 10 for adjusting the scanning or coverage areas of the sensor. As explained above, the mounting mechanism, which comprises base neck 16, nut 18 and mounting base 14, provides course and a fine adjustment means for adjusting the scanning or coverage area of the sensor 10. In FIG. 3A, the sensor body 12 is oriented or positioned to provide a scanning range 82 with an angle 80 to cover a particular scanning area. It should be noted the scanning range 82 and angle 80 typically have a 3-dimensional cone shape profile but only a 2-dimensional pie shape profile is shown for ease of explanation. FIG. 3B shows how the fine adjustment means can be used for rotating the sensor body 12 in the direction 92 to cover a new scanning area with the same scanning range 82 as FIG. 3A. To adjust, the nut 18 is loosened by unthreading the nut from the sensor body 12, the sensor body 12 is twisted or rotated in the direction shown by arrow 92 to a new position to cover a new scanning area and the nut 18 is then retightened to secure the new position of the sensor body 12. FIG. 3C shows how the course adjustment means can be used for rotating the sensor body 12 in the direction 90 to cover a new scanning area with the same scanning range 82 as FIG. 3A. To adjust, the base neck 16 is detached from or pulled out of the mounted base 14, the base neck is rotated in the direction shown by arrow 90 to a new position to cover a new scanning area and then it is reattached or reinserted into the mounting base to secure the sensor body 12 to the new position.

Figure 4A:
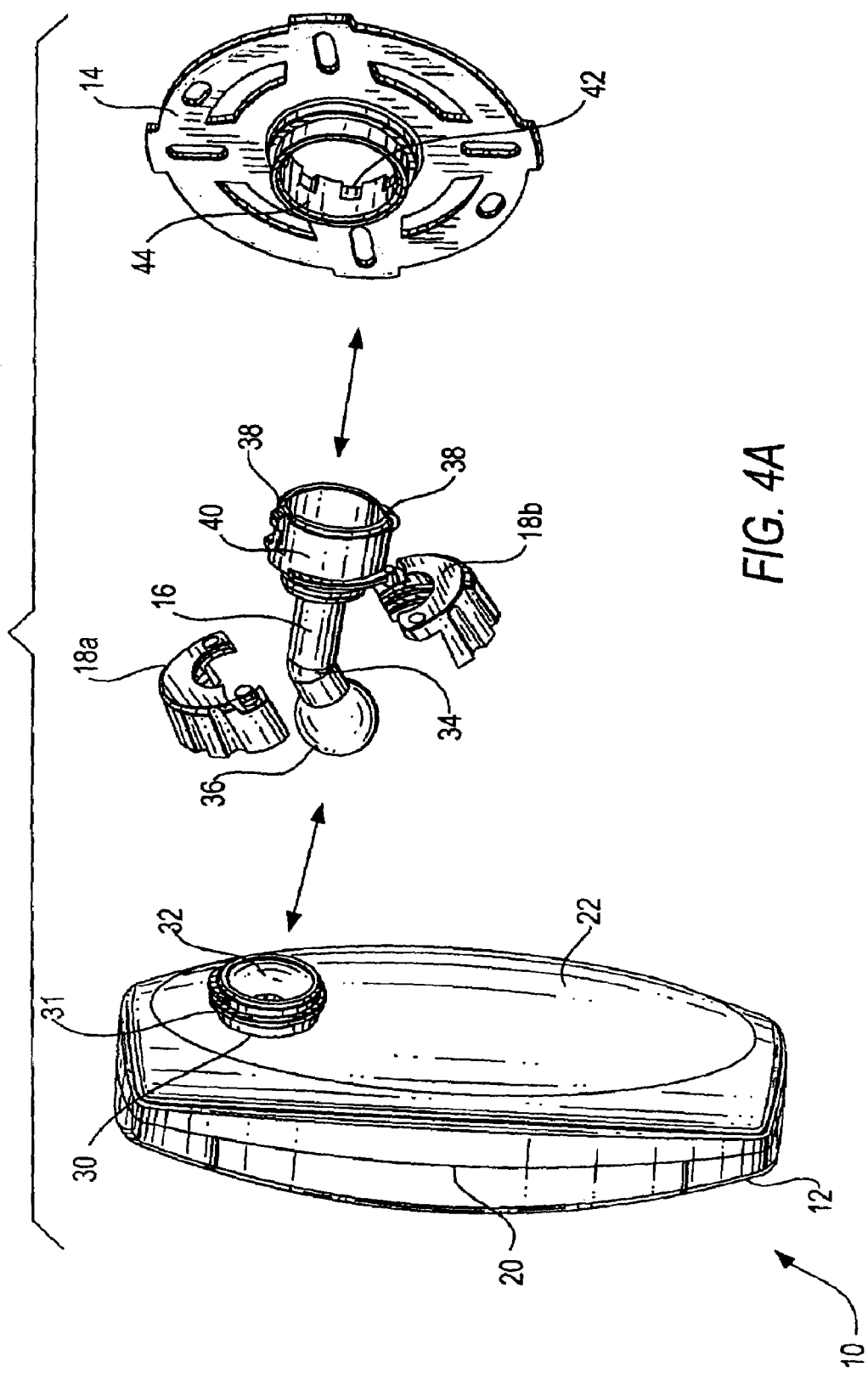
FIG. 4A shows another exploded view of the sensor of FIG. 1.

FIG. 4A shows the sensor body assembly 12 coupled to the mounting mechanism of the sensor 10 of FIG. 2. As explained above, the mounting mechanism, which comprises nut 18, base neck 16 and mounting base 14, provides fine and course adjustment means for the sensor 10. The inside periphery of the cylindrical member 30 of the back cover 22 is a socket having a semi-spherical surface 32 adapted to rotatably accept the ball element 36 of the base neck 16. The ball element 36 is secured in place by nut 18 (18a, 18b) when the nut is tightened and, when the nut 18 is loosened, the sensor body 12 is free to rotate around the ball element 36 to provide a fine adjustment means. The nut 18 is formed by a first nut half 18a and a second nut half 18b which can be detachably coupled to each other to form the single nut assembly 18.

Figure 4B:
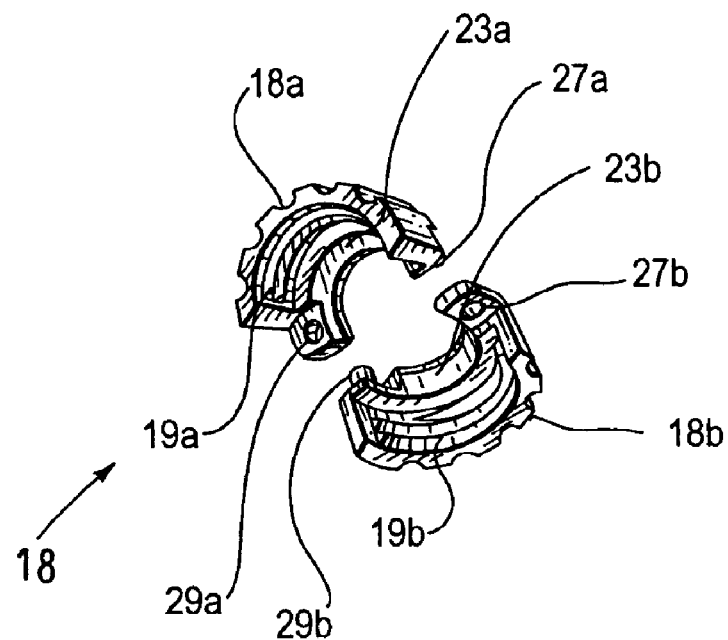
FIG. 4B shows an exploded view of the fastener of the sensor of FIG. 1.

For example, in one embodiment, FIG. 4B shows first nut half 18a having a stud 27a and an opening 29a for engaging with a respective opening 27b and stud 29b on second nut half 18b to secure or lock the halves 18a, 18b together to form a single nut assembly 18. Internal threads 19a, 19b located on the inside peripheries of the respective nut halves 18a, 18b are adapted for threading onto the external threads 31 located on the outside periphery of the cylindrical member 30 of the back cover 22. Partial spherical surfaces 23a, 23b located on the inside peripheries of respective nut halves 18a, 18b are adapted to rotate with the ball element 36 of the base neck 16 to provide a ball-socket or rotatable coupling.

Referring to FIG. 4A, the rear end of the base neck 16 permits the sensor body 12 to be rotated to one of several different positions and provides the second freedom of movement associated with the course means of adjustment. The rear end of the base neck 16 has a cylindrical member 40 which cooperates with the cylindrical member 44 in the mounting base 14 to orient and lock the base neck to the member 40. The base neck 16 can have a bend portion 34, located midway on the base neck, with a particular angle such as 30 degrees as shown in FIG. 3C. In one embodiment, the cylindrical member 40 of the base neck 16 is sized to slide and fit snugly within the cylindrical member 44 of the mounting base 14. The cylindrical member 40 has two snap tabs 38 which are 180 degrees spaced apart and extend from the periphery of the cylindrical member. The two snap tabs 38 are adapted to cooperate with a pair of the 8 slots 42 evenly spaced apart located on the inside periphery of the cylindrical member 44. This arrangement permits the base neck 16 to be rotated or turned to one of 8 different positions in the same plane as the mounting base 14.

During assembly, the nut halves 18*a*, 18*b* are assembled to form nut assembly 18 and then placed over the ball element 36 of the base neck 16. As the ball element 36 is inserted into the cylindrical member 30 of the back cover 22, the internal threads 19*a*, 19*b* of the nut 18 (FIG. 4A) engage the external threads 31 of the cylindrical member 30 of the back cover 22. As the nut 18 is tightened to the threads 31, the two partial spherical surfaces 23*a*, 23*b* (FIG. 4B) urge the ball element 36 against the semi-spherical surface 32 of the back cover 22. The ball element 36 is locked into a position by the three spherical surfaces 23*a*, 23*b*, 32 and the sensor body 12 is secured to the front end of the base neck 16.

The rotation of the sensor body 12 about the ball element 36 provides a first freedom of body rotation providing a scanning area which can be easily changed by loosening and then retightening the nut. That is, tightening the nut assembly 18 (18*a*, 18*b*) locks the sensor body 12 to the base neck 16 to secure the new position of the sensor body. Loosening the nut assembly 18 allows the position of the sensor body to be changed to provide a new scanning or coverage area.

As the cylindrical member 40 of the base neck 16 is inserted into the cylindrical member 44 of the mounting base 14, the two flexible snap tabs 38 are urged inward towards the center of the opening of the member 40. The cylindrical member 40 can be rotated inside the cylindrical member 44 until the snap tabs 38 engage one of the 8 slots 42 causing the snap tabs 38 to position themselves within the slots to lock the sensor body into one of the 8 positions. Different positions of the base neck 16 provide a second freedom of body rotation. The total rotation of the sensor body 12 is the combination of two freedom of rotations: the first freedom of rotation is provided by ball-socket coupling which allows the ball element 36 to be rotated around the sensor body 12 and the second freedom of rotation is provided by the rotatable coupling which allows the base neck 16 to be rotated around the mounting base 14.

Figure 5:
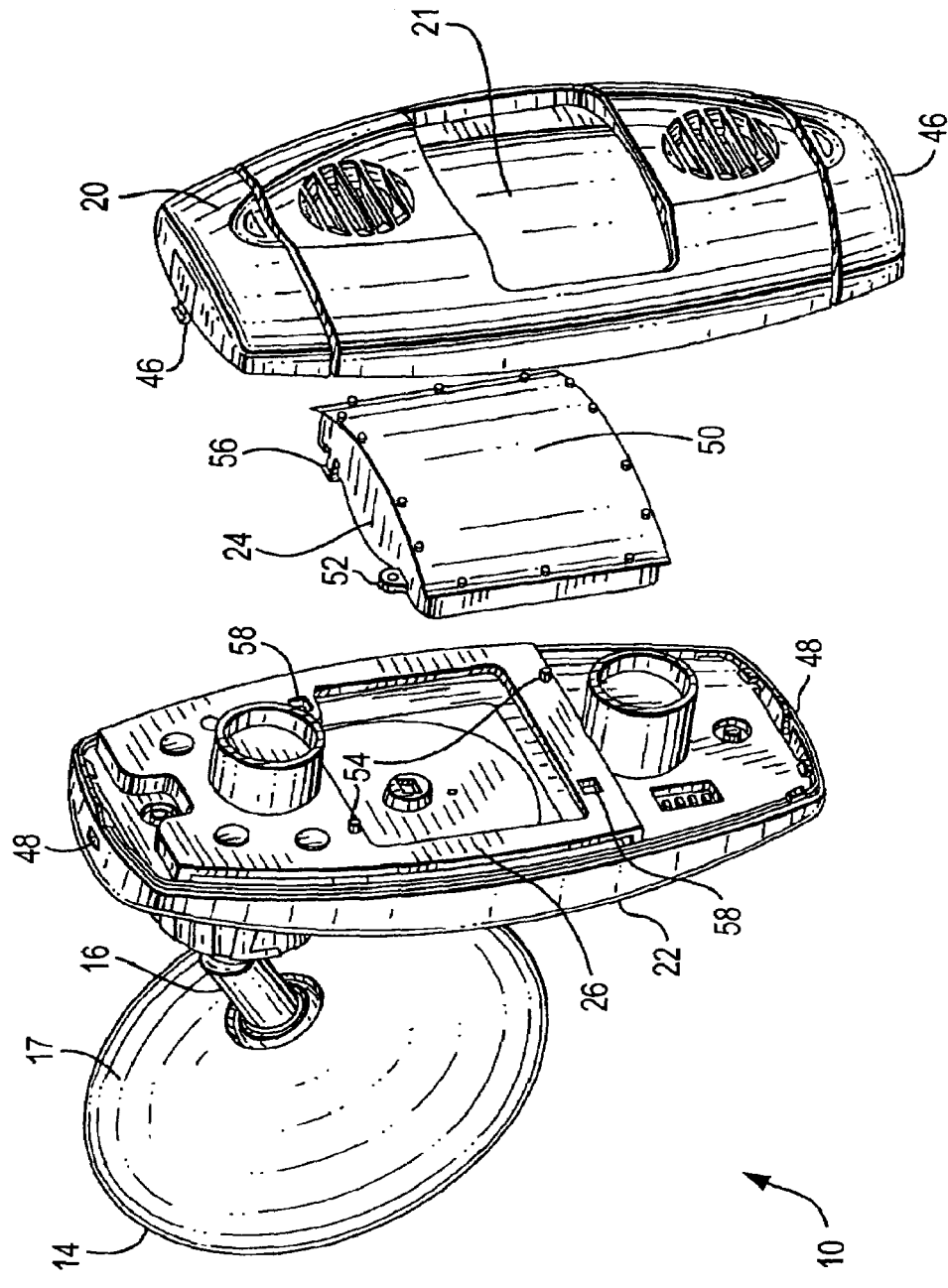
FIG. 5 shows the replacement lens feature of the sensor of FIG. 1.

FIG. 5 shows a detailed view of the replaceable PIR lens holder 24 of the sensor 10 of FIG. 1. A lens 50 is fixed to the front of the lens holder 24 by ultrasonic welding or other attachment means. A lug 52 with openings and a spaced apart snap tab 56 extend from the top and another lug and tab pair extend from the bottom portion (not shown) of the lens holder 24. Two spaced apart locating pins 54 on the frame 26 are coordinately located relative to the lugs 52 of the lens holder 24 and are sized to be received by the openings in the lugs. Likewise, two spaced apart slots 58 on the frame 26 are coordinately located relative to the snap tabs 56 of the lens holder 24 and are sized to receive the snap tabs 56. Both the pins 54 and lugs 52 are keyed for one way assembly to insure that the lens holder 24 is properly oriented relative to the frame 26 as it is attached to the frame. The lens holder 24 is attached to (snaps on) the frame 26, and the frame is held inside the enclosure comprising the front cover 20 and the back cover 22. This arrangement allows the lens to be properly oriented and easily replaced when necessary. The front cover 20 has a snap tab 46 on the top edge and another snap tab on the bottom edge (not shown). The back cover 22 has two corresponding slots 48 on the top and bottom edges. The snap tabs 46 are located relative to the slots 48 to allow the covers 20, 22 to be detachably coupled to each other to form a single assembly sensor body.

In addition, to using PIR sensing techniques, the present invention is also applicable to other occupancy sensing technologies such as ultrasonic and microwave means. For example, sensor 10 can be configured to transmit ultrasonic signals and monitor changes in the signals return time to detect occupancy. The sensor also can combine PIR and ultrasonic sensing technologies for highly accurate monitoring with minimum false triggering. The sensor 10 of the present invention can be employed in various applications such as for monitoring conference rooms, restrooms, stockrooms, stairwells and parking garages in commercial and institutional facilities. In addition, the sensor can be adapted to monitor porches, patios, hallways and backyards in residential settings.

Figure 6B:
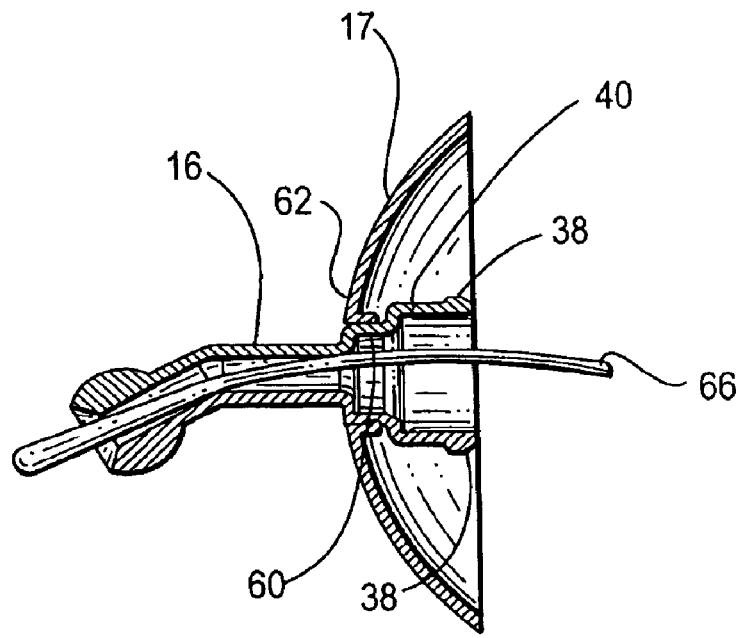
FIGS. 6A-6B show the sensor mounting arrangement of FIG. 1.
Figure 6A:
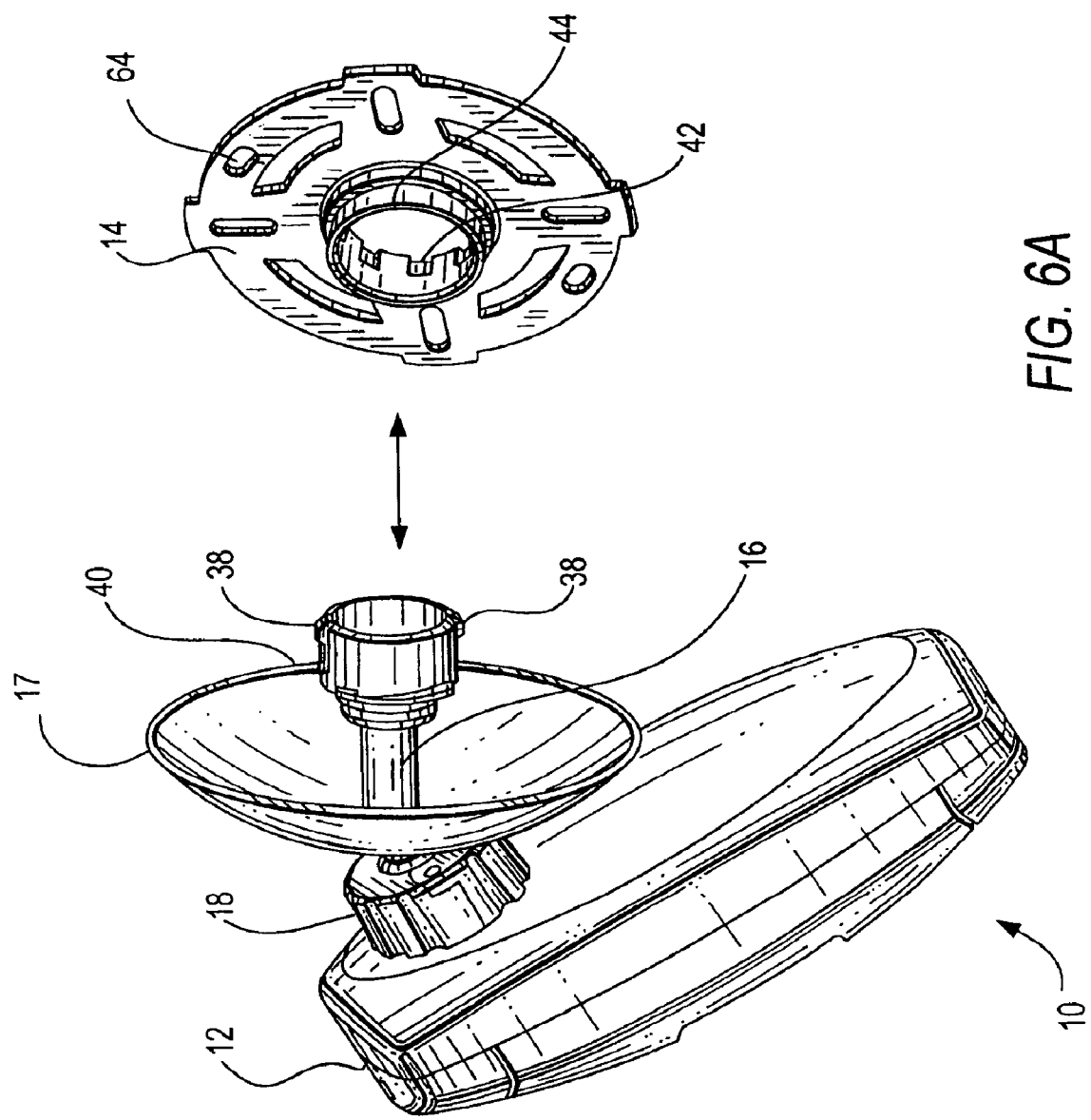

Referring to FIGS. 6A-6B, the mounting base 14 is provided for mounting sensor 10 to a wall, ceiling or other structure or surface. Mounting base 14 has openings 64 for receiving screws for attachment to a wall, ceiling or electrical junction box. Once the mounted base 14 is attached, a cable 66 (FIG. 6B) or other conductor from inside the wall or ceiling can be pulled through a center opening of cylindrical member 44 and attached to terminals in the sensor body 12. The cylindrical member 40 of the base neck 16 is inserted into the cylindrical member 44 of the mounting base 14. The leading end of the two snaps 38 are chamfered at approximately 45 degrees and the back ends are chamfered at approximately 30 degrees to permit the base neck 16 to be easily inserted into and removed from the cylindrical member 44. The base neck 16 is detached from the mounting base 14 by having the two snap tabs 38 overcome the shoulders of the slots 42. As the cylindrical member 40 on the base neck 16 is inserted into the cylindrical member 44, the shoulder on the base neck 16 engages the top end of the cylinder to define the depth of penetration. The base neck 16 can be rotated slightly to allow the two snap tabs 38 to engage the nearest two of eight slots 42 to lock the sensor body 12 into position. To complete the installation, referring to FIG. 6B, the base cover 17 is placed over the cylindrical member 40 and advanced until lip 62 engages groove 60 on the cylindrical member 40 to form a secure connection.

FIG. 7 is another example of an embodiment which includes an adjustable base 100 for base neck 116, which is substantially similar to neck 16 but which is modified to include base body 110. Base body 110 is substantially spherical in shape and has holes 112 and 114 for receiving arms 120 and 130. Arm 120 is connected to base cover 140 at a first end via a first extending arm 124, and extends up in a substantially L-shaped manner to a substantially perpendicular connection section 126.

Arm 130 is connected at a first end to base cover 140 and has a first extending arm section 134 and a substantially perpendicular connection section 136. While this design can be made from any suitable material, in one embodiment, all of these components are made from a plastic material such that arms 120 and 130 can be temporarily displaced as adjustable base 100 is snapped into these arms. Because base body 110 is substantially spherical shaped, it has a rounded surface which, when base body 110 is pressed down into arms 120 and 130, causes these arms to bend laterally to accept body 110. Once body 110 is pressed fully into base cover 140, arms 120 and 130 snap into corresponding holes 112 and 114 shown in FIG. 8B. In this way, connection sections 126 and 136 snap into corresponding holes 112 and 114 so that base body 110 is rotatable about an axis formed by connection sections 126 and 136.

Figure 8A:
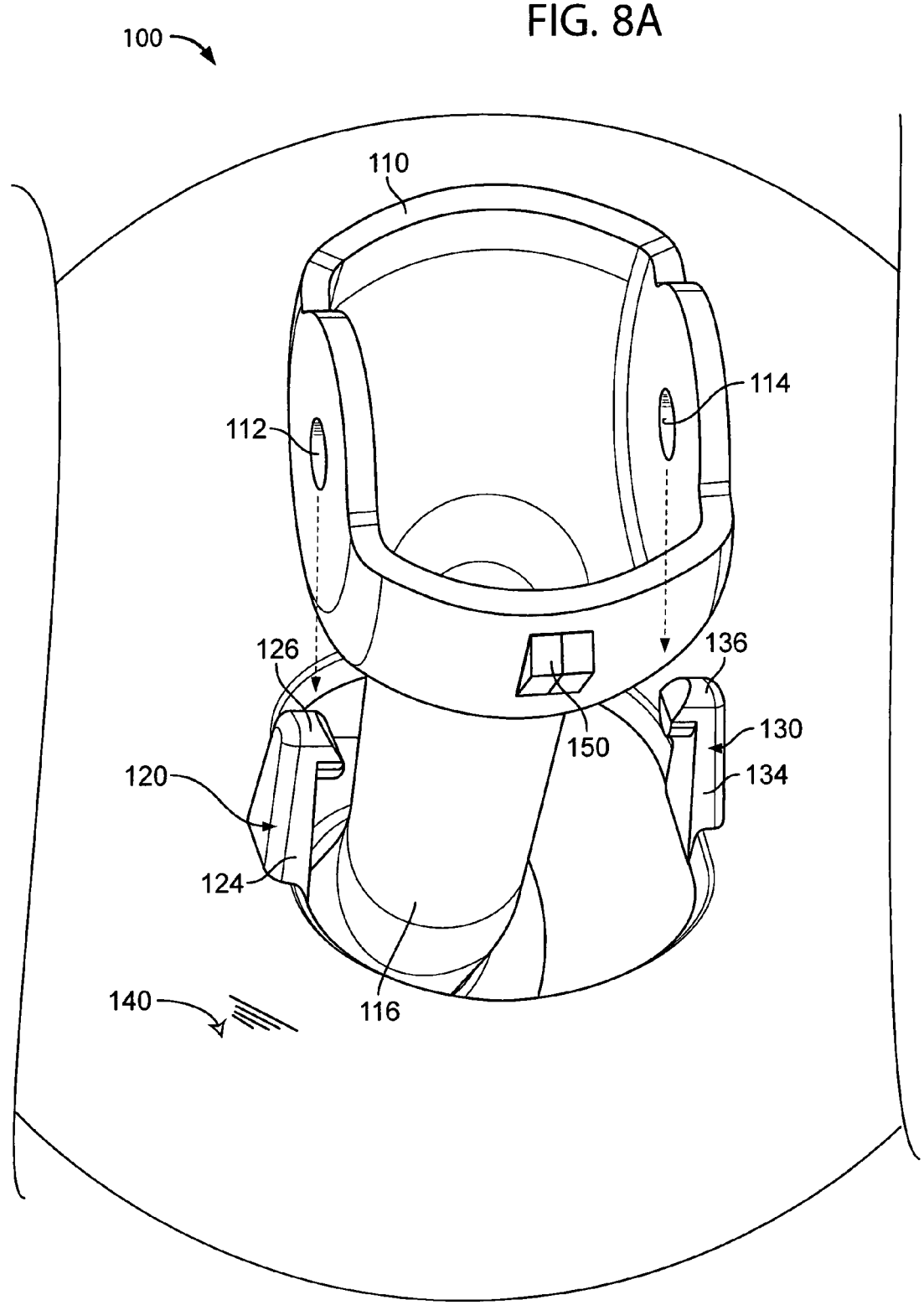
FIG. 8A is another back view of the embodiment shown in FIGS. 7
Figure 8B:
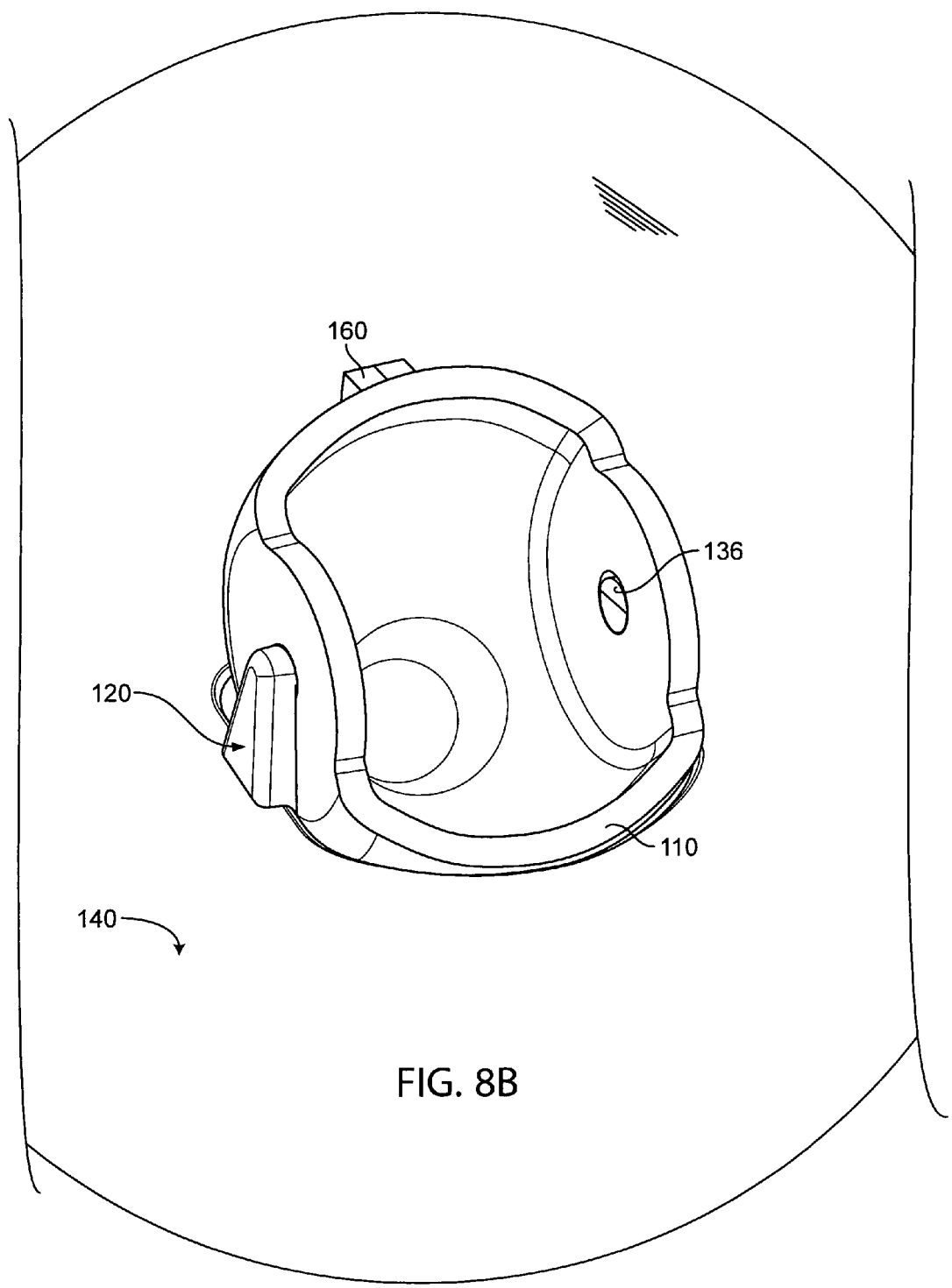
FIG. 8B is another back view of the embodiment shown in FIG. 7.
Figure 9:
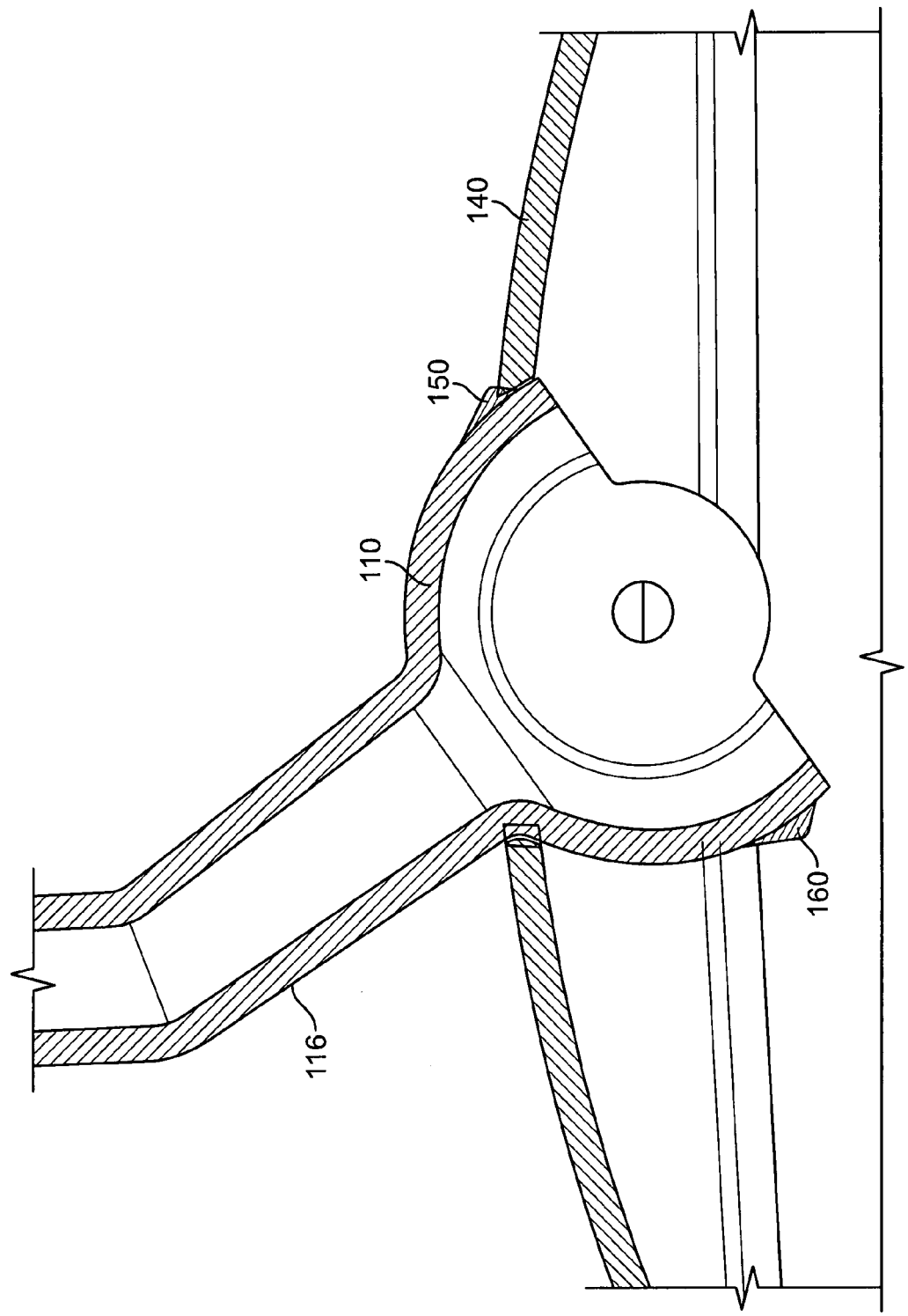
FIG. 9 is a side cross sectional view of the embodiment shown in FIG. 7.

Base body 110 also includes two locking elements 150 and 160 (See FIGS. 8A and 8B). Locking elements 150 and 160 can be formed in any manner but in this case are formed as ramp shaped protrusions having a substantially triangular cross-section extending out from body 110. Body 110 has two locking elements 150 and 160 so that base body 110 can be semi-permanently locked in at least two different positions. In a first position, neck 116 is rotated around connection sections 126 and 136 until neck 116 contacts base cover 140. During this rotation, locking element 150 is pressed through base cover 140 by displacing base cover 140 so that locking element 150 pops through base cover 140. At this point, locking element 150 is positioned outside of base cover 140 and is kept in position via a frictional and mechanical interface with base cover 140 (See FIG. 9). In this position, arm 116 is locked against further movement in a first direction by arm 116 contacting body 140. Arm 116 is also semi-permanently locked in the other direction by locking element 150.

To rotate arm 116 back, a user must use additional force to force locking element 150 through and past base cover 140 by displacing base cover 140. The resistance to movement is provided substantially by the structural rigidity of base cover 140. Base body 110 also has some minimal flexibility as well and therefore can flex as well during this motion.

Figure 10:
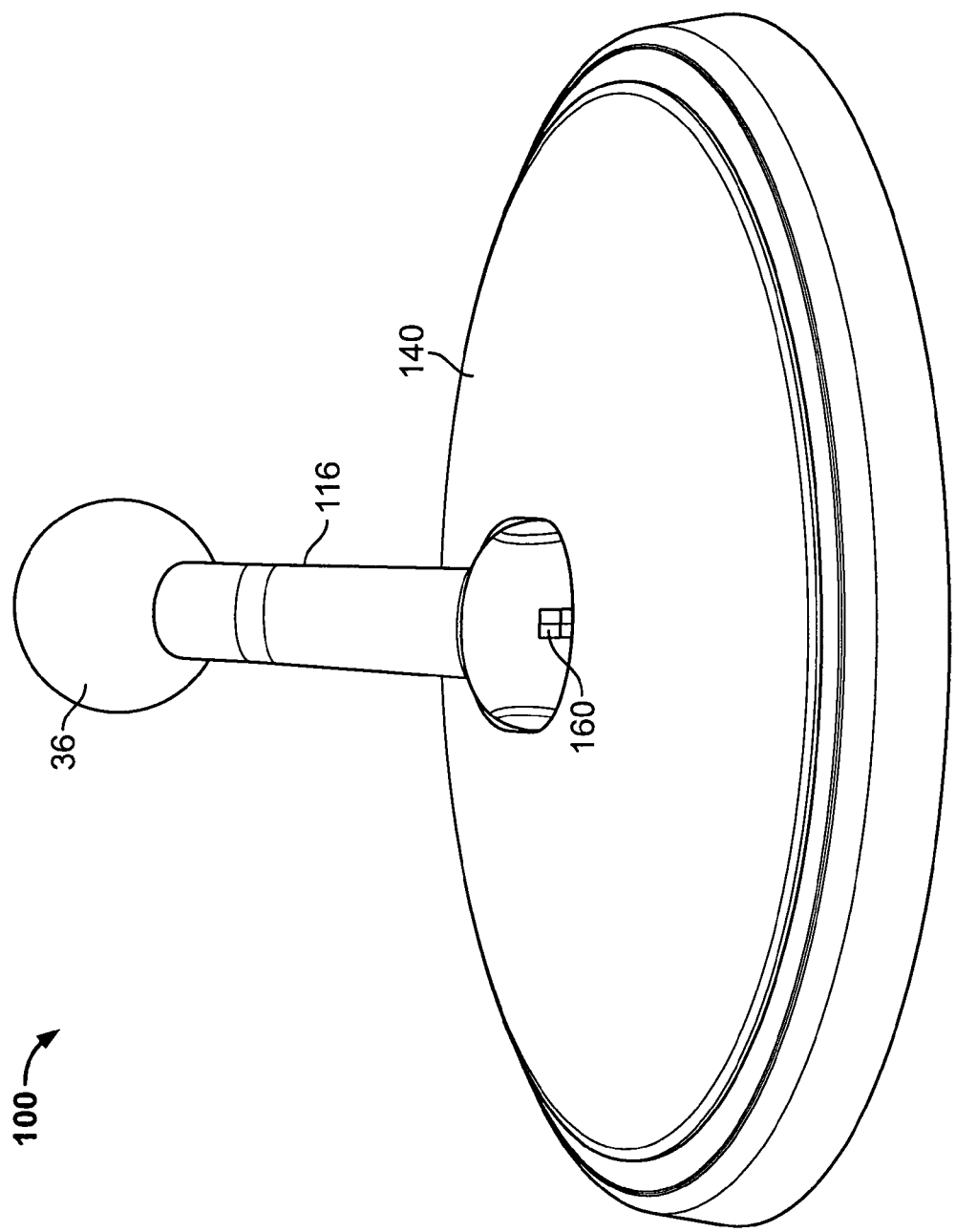
FIG. 10 is a side view of the embodiment shown in FIG. 7.

Alternatively, in the opposite position, a user can push arm 116 in an opposite direction such that locking element 160 pops through base cover 140 and then extends outside of base cover 140 as shown in FIG. 10. In this position, as stated above, neck 116 is semi-permanently locked so that, neck 116 effectively remains in that position, with further rotational movement being blocked at one end by arm 116 pressing against base cover 140 and the second end being blocked by lock 160 pressing against cover 140 similar to that shown in FIG. 9. As stated above, neck 116 can be unlocked from this position via a user moving neck 116 back such that locking element 160 snaps through cover 140 thereby freeing neck 116 to move back into an unlocked position.

The opposite end of arm 116 is connected to ball shaped member 36 which as stated above, is coupled to sensor 10. This embodiment therefore provides further adjustability for sensor 10 so that sensor 10 can be positioned in a proper position.

While the device can be locked semi-permanently in position, the neck or arm 116 can be repeatedly moved into these two different positions described above. In addition, base cover 140 can be mounted on a substantially vertical surface such as a wall or on a substantially horizontal surface such as a ceiling as well.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

What is claimed is:

1. A sensor mounting device comprising:
    a base member adapted to be mounted to a structure; and
    a base neck comprising:
        i) a first end having a ball-socket coupling and adapted to be coupled to a sensor; and
        ii) a second end comprising a rotatable coupling coupled to said base member; and
    a plurality of arms coupled to said base member at a first end, with each arm having a second end configured to be coupled to said second end of said base neck in a rotatable manner.

2. The device as in claim 1, wherein at least one of said plurality of arms is L-shaped.

3. The device as in claim 1, wherein said second end of said base neck comprises a body having at least one hole configured to receive at least one of said plurality of arms to form a rotatable coupling.

4. The device as in claim 3, wherein said body is substantially spherical shaped.

5. The device as in claim 1, further comprising at least one locking element for selectively locking said base neck in at least a first position.

6. The device as in claim 5, further comprising at least one additional locking element for selectively locking said base neck in at least two different positions.

7. The device as in claim 5, wherein said at least one locking element is ramp shaped to form a friction fit with the base member to lock said base neck in at least one position.

8. A sensor mounting mechanism comprising:
    a base member adapted to be mounted to a structure; and
    a base neck having a first end and a second end, said first end adapted to be coupled to a sensor with a ball-socket coupling and said second end coupled to said base member with a rotating coupling wherein said rotating coupling is rotatable about an axis transverse to a longitudinal extension of said base neck.

* * * * *